May 13, 1958  E. B. HUDSON  2,834,593
PALLET FOR SINTERING MACHINES
Filed May 23, 1955  2 Sheets-Sheet 1
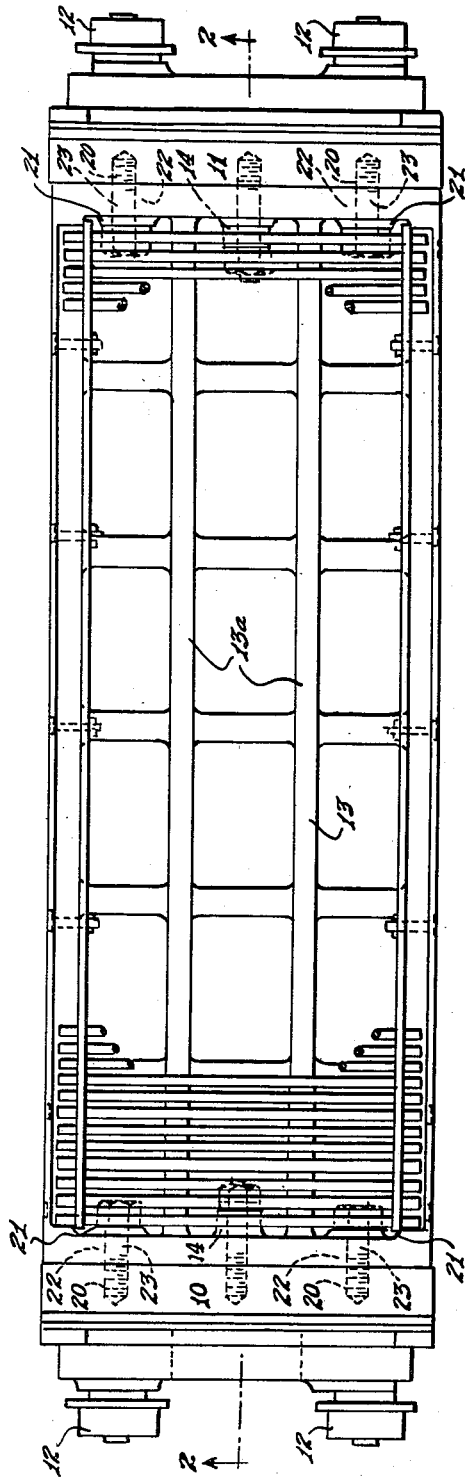
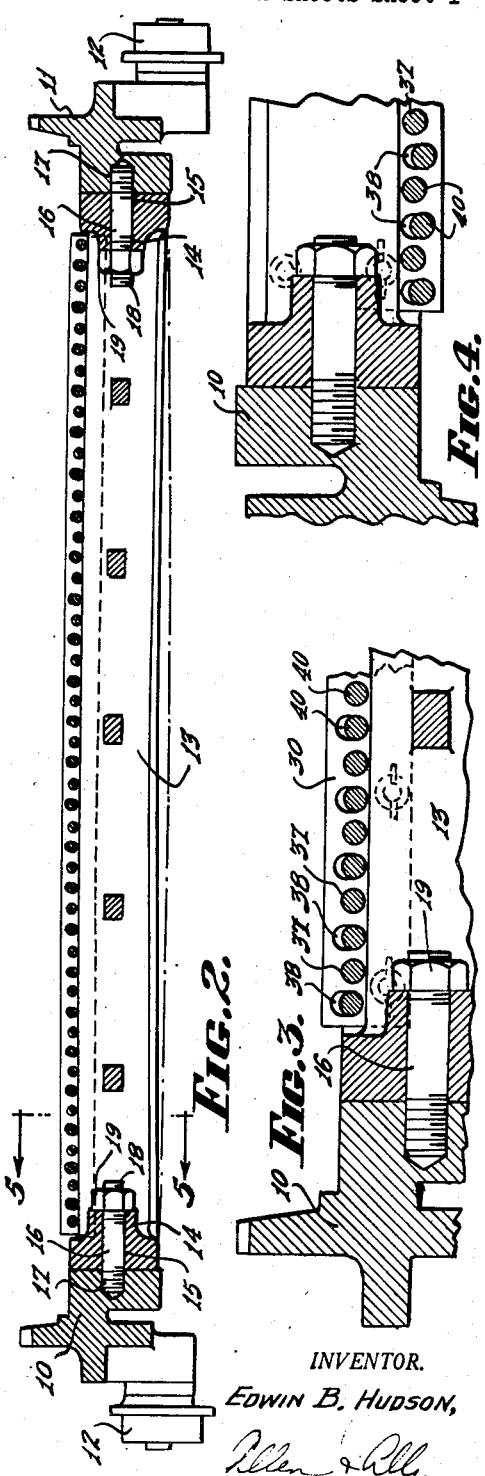
INVENTOR.
EDWIN B. HUDSON,
ATTORNEYS.

May 13, 1958　　　E. B. HUDSON　　　2,834,593
PALLET FOR SINTERING MACHINES
Filed May 23, 1955　　　2 Sheets-Sheet 2
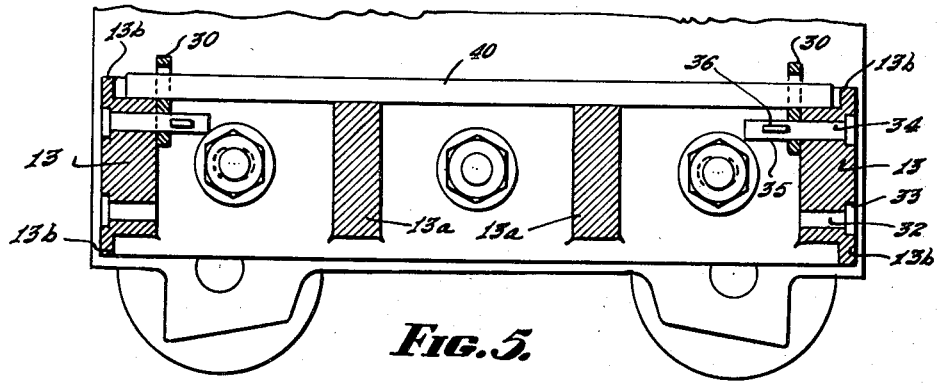
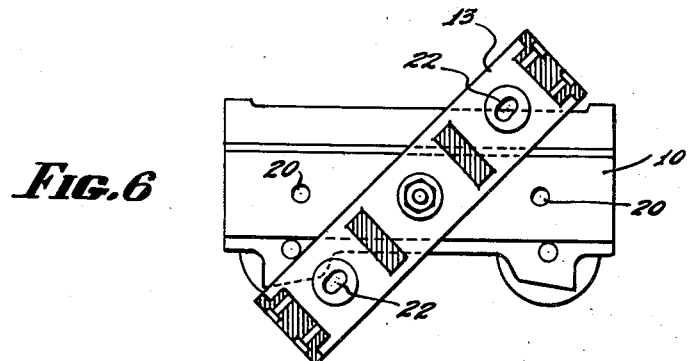
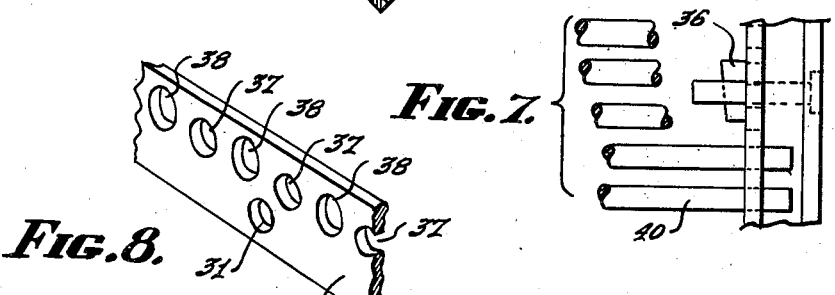
INVENTOR.
EDWIN B. HUDSON,
BY
ATTORNEYS.

United States Patent Office 2,834,593
Patented May 13, 1958

2,834,593

PALLET FOR SINTERING MACHINES

Edwin B. Hudson, Middletown, Ohio, assignor to Armco Steel Corporation, Middletown, Ohio, a corporation of Ohio Application May 23, 1955, Serial No. 510,478

10 Claims. (Cl. 266—21)

This invention relates to a pallet for sintering machines. Such pallets generally comprise a frame carrying a grate and the frame is mounted on wheels so that it may be pushed along a sintering path after the grate has been charged with the material to be sintered.

In the conventional sintering machine where the sinter is burned up to temperatures of 2250° F., the pallet frame shows a definite sag after two or three months of operation because of the operation at elevated temperatures while it is loaded with sinter and the weight of the grate bars. Since the pallet must make close contact with the dead plates of the wind box structure, the sag in the pallet frame causes interference with the dead plates and usually results in breakage of the shear pin in the drive. Even when the sag is not great enough to produce the above difficulty, the sag will still increase the power requirements because the weight of the pallet will be carried between dead plates rather than between pallet wheels. This condition of sag has in the past been corrected by machining the lower side of the pallet to the original bottom dimension. This removal of metal reduces the section so that thereafter sag will occur more rapidly and, whereas a new pallet might not require treatment for two or three months, a pallet which has once been machined might require treatment after one month. After a few such treatments, the pallet must be replaced.

The grate bars used in the conventional pallet are generally either cast or forged and are relatively expensive and they must be fastened to the pallet by lugs. Since the grate bars on sintering machines are expendable, it is desirable and even necessary to keep their cost to a minimum because grate bar replacement costs are charged to the cost of sintering.

It is also desirable that the grate bars be completely cleared of sintered material when the pallet is inverted at the end of the sintering path and to accomplish this some grate bars have been made movable with respect to other grate bars so that there will be relative movement as between various grate bars when the pallet is inverted. This has further complicated the cast or forged structure of the grate bars.

With the various foregoing considerations in mind, one of the objects of the present invention is to provide a pallet which will be very much less expensive than comparable pallets have been in the past. It is another object of the invention to provide a pallet having a grate bar carrying frame which may readily be inverted and fixed in inverted position, so that after the frame has begun to sag, it can be inverted so as to have a slight arch, whereby the life of the pallet is very greatly increased.

It is yet another object of the invention to provide a pallet wherein the grate structure may be secured to either side of the pallet depending upon whether the pallet is in obverted or inverted position.

A still further object of the invention involves the provision of rod-like grate bars which may be rolled on a rod mill and which will, therefore, be very much cheaper than the cast or forged grate bars. In connection with the rod-like grate bars, it is still another object of the invention to provide simple means for producing relative movement between adjacent grate bars attendant upon dumping the pallet at the end of the sintering path.

These and various other objects of the invention which will be pointed out in greater detail hereinafter or which will be apparent to one skilled in the art upon reading these specifications, are accomplished by that certain construction and arrangement of parts of which I shall now describe an exemplary embodiment.

Reference is made to the drawings forming a part hereof and in which:

Figure 1 is a plan view with parts broken away of a pallet according to the present invention.

Figure 2 is a cross-sectional view of the same taken on the line 2—2 of Figure 1.

Figure 3 is an enlarged fragmentary view of the left end of Figure 2.

Figure 4 is a view similar to Figure 3 but showing the relationship of parts after the charge has been dumped and the pallet is being returned to the charging end of the machine.

Figure 5 is a cross-sectional view taken on the line 5—5 of Figure 2 on an enlarged scale.

Figure 6 is a view similar to Figure 5 on a smaller scale showing how the grate bar carrying frame may be inverted.

Figure 7 is a fragmentary detailed plan view showing how the grate bar carriers are secured to the carrying frame; and Figure 8 is a fragmentary perspective view of a grate bar carrier.

Briefly, in the practice of the invention I provide a pair of end frame members each of which is provided with a pair of aligned wheels. A grate bar carrying frame extends between the end frames and is pivoted to the end frames on its longitudinal axis so that it may be inverted. Means are provided for securing it to the end frame members in either obverted or inverted position. A pair of grate bar carriers is releasably secured to the carrying frame and may be secured to either side of the grate bar carrying frame. The grate bar carriers are provided with aligned pairs of apertures, some of which are circular and alternate ones of which are in the form of a vertically elongated slot. All the apertures are tangent at the bottom to a horizontal plane but when the pallet is dumped at the end of the sintering path, alternate grate bars, which are in the form of rod-like elements engaged at their ends in aligned pairs of apertures, may drop in the elongated slots to increase the spacing between adjacent grate bars so that they will be thoroughly cleared.

Referring now in more detail to the drawings, the pallet according to the present invention comprises the end frame members 10 and 11, each of which is provided with two wheels 12 as is conventional. Extending between the end frame members 10 and 11 is a grate bar carrying frame 13. This frame, as best seen in Figure 1, may be in the form of a rectangle with longitudinal and transverse beam elements. At each end of the frame 13 there is provided a central boss 14 having a bore 15. A stud 16 passes through the bore 15 in the boss 14 and is threaded into the end frame members 10 and 11, as indicated at 17. The free ends of the studs 16 are threaded as at 18 and a nut 19 holds the structure in assembly.

At this point it will be clear that the entire frame 13 may pivot about the stud 16 with respect to the end frame members 10 and 11, as clearly seen in Figure 6.

The end frame members 10 and 11 are provided with the threaded holes 20 and the frame member 13 is provided with the bosses 21 which have the bores 22, and the frame 13 may then be fixed against pivotal movement with respect to the end frame members 10 and 11 by means of bolts 23.

In actual operation, it has been found that a sag of 5/16 inch occurs in about three months. If the pallet is reversed as above outlined, there will be provided a 5/16 inch arch, or upward curve, and it would then take about six months' operation before the downward sag would again amount to 5/16 inch, and the frame would pass through a straight condition before downward sag again began. It, therefore, becomes unnecessary to do any machining on the pallets. Thus, if pallets are reversed every thirty or sixty days of plate operation, all interference of pallets with the dead plates is eliminated.

It will be understood that when a pallet is reversed for the purpose of reversing the sag, as a result of uneven expansion the holes 20 and 22 might not line up. For this reason, as best seen in Figure 6, the holes 22 are in effect elongated slots whereas the holes 20 are ordinary threaded holes.

Also, when a pallet is reversed on account of sag, the grate structure must be removed and replaced on the other side of the pallet. For this reason, the grate bar carrying frame 13 is completely symmetrical and is arranged so that the grate bar carriers may be secured on either side. The grate bar carriers are indicated at 30 and comprise elongated plates provided with apertures for the grate bars. The plates 30 are provided with apertures 31 by means of which they may be attached to the frame 13. The frame 13 is provided with the holes 32 which are counterbored as at 33 to accommodate the headed pins 34. The pins 34 are provided with slots 35 and the pins 34 pass through the holes 31 in the plates 30 and are held in position by wedges 36. Thus, it will be seen that the plates 30 can easily be removed and replaced on the other side of the pallet.

Each of the plates 30 has a series of apertures some of which, as at 37, are circular and alternate ones, as at 38, are in the form of vertically elongated slots. The slots 38 are of a width equal to the diameter of the holes 37 and, as best seen for example in Figure 3, all of the apertures are tangent at the bottom to a substantially horizontal plane. The grate bars themselves are in the form of rods 40 and it will be seen that the rods 40, when the pallet is in obverted position as during a sintering pass, will be in a substantially horizontal common plane, as seen in Figures 2 and 3. Intermediate their ends, the bars 40 are supported on the beams 13a and they are retained at their ends by the flanges 13b of the frame 13.

When the pallet is dumped at the end of the sintering pass and comes to an inverted position, as shown in Figure 4, those bars 40 which are retained in the slots 38 can drop with respect to the adjacent rods, whereby the distance between rods is increased and the grate is completely clear.

It is believed that it will now be clear how the advantages and objects above set forth are accomplished by the construction described. It will be understood that various modifications may be made without departing from the spirit of the invention and I therefore do not intend to limit myself otherwise than as set forth in the claims which follow.

Having now fully described my invention, what I claim as new and desire to secure by Letters Patent is:

1. A pallet for sintering machines, comprising a pair of end frame members each provided with a pair of aligned wheels, and a grate bar carrying frame, means pivotally securing said grate bar carrying frame to said end frame members on the longitudinal axis of said grate bar carrying frame, whereby said grate bar carrying frame may be inverted, means fixing said grate bar carrying frame to said end frame members against pivotal movement both in obverted and inverted position, a pair of grate bar carriers, means for securing said grate bar carriers to either side of said grate bar carrying frame, said grate bar carriers having a series of aligned apertures, alternate of said apertures being substantially circular, and intermediate ones of said apertures being vertically elongated slots of a width equal to the diameter of said circular apertures, and a series of rod-like grate bars retained at their ends in aligned apertures in the respective grate bar carriers.

2. In a pallet for sintering machines, which pallet is adapted to be moved in a sintering path in an obverted position and in a return path in an inverted position, a pair of grate bar carriers having a series of aligned grate bar apertures, pairs of said aligned apertures being circular, and alternate pairs of said aligned apertures being vertically elongated slots of a width equal to the diameter of said circular apertures, all of said apertures in the obverted position of said pallet being substantially tangent at the bottom to a horizontal plane, and a number of rod-like grate bars retained at their ends in pairs of aligned apertures in the respective grate bar carriers, whereby in the obverted position of said pallet all the grate bars occupy substantially a common horizontal plane, and in the inverted position alternate ones of said grate bars drop in said elongated slots.

3. A pallet for sintering machines, comprising a pair of end frame members each provided with a pair of aligned wheels, and a grate bar carrying frame, means pivotally securing said grate bar carrying frame to said end frame members on the longitudinal central axis of said grate bar carrying frame, whereby said grate bar carrying frame may be inverted, and readily removable means fixing said grate bar carrying frame to said end frame members against pivotal movement both in obverted and inverted position.

4. A pallet according to claim 3, wherein the means fixing said grate bar carrying frame to said end frame members comprise threaded holes in said end frame members, oversized holes in said grate bar carrying frame adapted to permit access to said threaded holes regardless of distortion of said grate bar carrying frame, and bolts passing through said over-sized holes and engaging in said threaded holes.

5. A pallet according to claim 4, wherein said oversized holes are horizontally elongated slots.

6. A pallet according to claim 3, including a pair of grate bar carriers, and having seats for the attachment of said carriers on both the obverse and reverse sides of said grate bar carrying frame.

7. A pallet according to claim 6, wherein said carriers comprise elongated apertured plates.

8. A pallet according to claim 7, wherein said plates have a series of aligned apertures, some aligned pairs of said apertures being circular, and alternate aligned pairs of said apertures being vertically elongated slots of a width equal to the diameter of said circular apertures, all of said apertures in the obverted position of said pallet being substantially tangent at the bottom to a horizontal plane.

9. A pallet according to claim 8, wherein a series of rod-like rolled grate bars are retained at their ends in aligned pairs of said carrier apertures, whereby in the obverted position of said pallet all the grate bars occupy substantially a common horizontal plane, and in the inverted position of said pallet alternate ones of said grate bars drop in said elongated slots.

10. In a pallet for sintering machines, which pallet is adapted to be moved in a sintering path in an obverted position and in a return path in an inverted position, a grate comprising a pair of like grate bar carriers and a series of rod-like bars extending therebetween, a series of aligned apertures in each of said grate bar carriers, alternate of said apertures being substantially circular, and intermediate ones of said apertures being vertically elongated slots of a width equal at least to the diameter of said circular apertures, and said series of rod-like grate bars being removably retained at their ends in the aligned apertures in the respective grate bar carriers, whereby as said pallet is moved from one position of use to another, alternate ones of said grate bars may drop in said elongated slots and whereby said rod-like grate bars may readily be replaced.

References Cited in the file of this patent

UNITED STATES PATENTS

| | | |
|---|---|---|
| 342,766 | Swallow | May 25, 1886 |
| 1,932,496 | Watzke | Oct. 31, 1933 |
| 2,174,338 | Warner | Sept. 26, 1939 |
| 2,257,416 | Grethe | Sept. 30, 1941 |
| 2,322,873 | Moriarty | June 29, 1943 |
| 2,453,845 | Jackson | Nov. 16, 1948 |